United States Patent
Behruzi et al.

(10) Patent No.: US 8,202,357 B2
(45) Date of Patent: Jun. 19, 2012

(54) BUBBLE TRAP FOR A FUEL TANK IN A SPACECRAFT

(75) Inventors: Kei Philipp Behruzi, Bremen (DE); Dennis Haake, Ritterhude (DE); Mark Michaelis, Bremen (DE)

(73) Assignee: Astrium GmbH, Ottobrunn (DE)

( * ) Notice: Subject to any disclaimer, the term of this patent is extended or adjusted under 35 U.S.C. 154(b) by 306 days.

(21) Appl. No.: 12/799,070

(22) Filed: Apr. 15, 2010

(65) Prior Publication Data

US 2010/0264275 A1    Oct. 21, 2010

(30) Foreign Application Priority Data

Apr. 16, 2009 (DE) .......................... 10 2009 019 002

(51) Int. Cl.
  *B01D 19/00* (2006.01)
(52) U.S. Cl. ................. 96/204; 96/206; 96/219; 96/220
(58) Field of Classification Search ............... 96/204, 96/219, 206, 207, 220; 244/172.2
  See application file for complete search history.

(56) References Cited

U.S. PATENT DOCUMENTS

| | | |
|---|---|---|
| 2,711,756 A | 6/1955 | Peck et al. |
| 3,020,950 A | 2/1962 | Schraivogel |
| 3,202,160 A | 8/1965 | Barger |
| 3,234,728 A | 2/1966 | Christian et al. |
| 3,744,738 A | 7/1973 | Howard |
| 3,854,905 A | 12/1974 | Balzer et al. |
| 3,933,448 A | 1/1976 | Di Peri |
| 4,027,494 A | 6/1977 | Fletcher et al. |
| 4,102,655 A | 7/1978 | Jeffery et al. |
| 4,168,718 A | 9/1979 | Frosch et al. |
| 4,253,490 A | 3/1981 | Hansel |
| 4,272,257 A | 6/1981 | Ellion et al. |
| 4,399,831 A | 8/1983 | Robert |
| 4,435,196 A | 3/1984 | Pielkenrood |
| 4,489,745 A * | 12/1984 | Netter et al. ................... 137/209 |
| 4,617,031 A | 10/1986 | Suh et al. |
| 4,715,399 A | 12/1987 | Jaekle, Jr. et al. |
| 4,733,531 A | 3/1988 | Grove |
| 4,743,278 A | 5/1988 | Yeh |
| 4,768,541 A | 9/1988 | Uney et al. |
| 4,898,030 A | 2/1990 | Yeh |
| 4,901,762 A | 2/1990 | Miller, Jr. et al. |
| 4,976,398 A | 12/1990 | Bruhn |
| 5,071,093 A | 12/1991 | Perdu |
| 5,240,038 A | 8/1993 | Canedi |
| 5,263,329 A | 11/1993 | Grove et al. |
| 5,279,323 A * | 1/1994 | Grove et al. ................... 137/154 |
| 5,293,895 A | 3/1994 | Grove et al. |
| 5,334,239 A | 8/1994 | Choe et al. |

(Continued)

FOREIGN PATENT DOCUMENTS

GB    2 109 760    6/1983

*Primary Examiner* — Duane Smith
*Assistant Examiner* — Douglas Theisen
(74) *Attorney, Agent, or Firm* — W. F. Fasse

(57) ABSTRACT

A bubble trap is especially suitable for separating gas bubbles from liquid fuel supplied from a fuel tank in a spacecraft. The bubble trap includes a rotationally symmetrical collecting container forming a container wall, plural liquid guide vanes extending radially and longitudinally along the inside of the container wall, a perforated conical gas separator that tapers conically toward an outlet of the collecting container, and screens arranged between the gas separator and the outlet.

19 Claims, 7 Drawing Sheets

U.S. PATENT DOCUMENTS

| | | | |
|---|---|---|---|
| 5,901,557 A * | 5/1999 | Grayson | 62/45.1 |
| 6,014,987 A | 1/2000 | List et al. | |
| 6,432,178 B2 | 8/2002 | Lichon et al. | |
| 6,478,962 B1 | 11/2002 | Brockhoff et al. | |
| 6,745,983 B2 | 6/2004 | Taylor | |
| 6,840,275 B2 | 1/2005 | Grayson | |
| 7,395,832 B2 * | 7/2008 | Behruzi et al. | 137/154 |
| 7,621,291 B2 * | 11/2009 | Behruzi et al. | 137/154 |
| 2001/0042441 A1 | 11/2001 | Purdom et al. | |
| 2007/0084509 A1 | 4/2007 | Behruzi et al. | |
| 2007/0239098 A1 | 10/2007 | Chapman-Jones | |
| 2008/0171962 A1 | 7/2008 | Engelhardt et al. | |
| 2008/0237099 A1 | 10/2008 | Behruzi et al. | |
| 2009/0134170 A1 | 5/2009 | Behruzi et al. | |

* cited by examiner

US 8,202,357 B2

BUBBLE TRAP FOR A FUEL TANK IN A SPACECRAFT

PRIORITY CLAIM

This application is based on and claims the priority under 35 U.S.C. §119 of German Patent Application 10 2009 019 002.3, filed on Apr. 16, 2009, the entire disclosure of which is incorporated herein by reference.

FIELD OF THE INVENTION

The invention relates to a bubble trap or gas separator for separating gas bubbles from a liquid, and especially for separating gas from a liquid fuel that is supplied from a fuel tank in a spacecraft for operating the engines of the spacecraft.

BACKGROUND INFORMATION

Spacecraft such as rockets, satellites, shuttles, transfer vehicles, orbital stations, and other bodies flying in space are typically outfitted with suitable containers or fuel tanks for storing liquid fuels that are used to power the engines, including engines or thrusters for the position regulation in space, as well as engines or thrusters for carrying out apogee maneuvers. In order to drive or propel the liquid fuel out of the fuel tank, the fuel tank is typically also charged with a pressurized driving gas, which pressurizes the liquid fuel and drives it out of the tank to the combustion chamber or reaction chamber of an engine of the spacecraft in which the fuel will be consumed. Inert gases such as helium (He) or nitrogen ($N_2$) are typically used as the pressurized driving gas, for which purpose they are introduced under pressure into the fuel tank and thereby press the fuel into the pipeline system leading from the respective tank to the respective connected rocket engine. In that regard it is important to achieve a complete, reliable and sure separation between the driving gas used as a conveying medium and the liquid fuel being supplied into the engine, because the liquid fuel must absolutely and surely be free of foreign gas inclusions when it is supplied to the engine, in order to avoid combustion problems during ignition and burning of the fuel in the engine.

In the standard conventional fuel systems of spacecraft, the separation of the driving gas from the liquid fuel is achieved either in the fuel tank itself or in a separate bubble trap or gas separation device connected downstream from the fuel tank. In either case, the fuel exiting from the tank outlet or the bubble trap outlet is provided free of gas bubbles or inclusions. In that regard, the positioning of the fuel tanks in the spacecraft has an important influence on the layout or design of the tank. Therefore, it is usually ensured that the tank outlet is positioned at the lowest point of the tank in the direction of the main effective acceleration, so that a bubble-free filling of the tanks on the ground on earth and a complete emptying of the tanks in orbit is possible. In some cases, however, it is desired to arrange or install the fuel tank with its outlet oriented contrary to the main acceleration direction, for example in a lander unit or module that is to land on the moon, or for a fuel tank that is to be transported to the launch area in a horizontal orientation. In these cases, a bubble-free supply of liquid fuel cannot be ensured under some circumstances, because gas can collect in the fuel lines. In those cases it is generally necessary to suitably adapt the fuel tank or to use a specially designed bubble trap connected downstream from the fuel tank.

The quantity of driving gas that can accumulate in the fuel line system from the supplied fuel during a specified space flight mission, is generally known or can be determined. Thus, the quantity or volume of gas that must be reliably separated from the supplied fuel during a given space flight mission is known or can be determined. Furthermore, except for the gas quantities or inclusions that are already located in the fuel line system, the fuel tanks are still able to provide bubble-free liquid fuel even after a gas breakthrough. In that regard, the gas quantity that is to be separated from the liquid fuel in the fuel line system is strongly dependent on the fuel line system volume and is normally small in comparison to the volume of the fuel tank.

Bubble traps or gas separator devices have already become known in the prior art, in various different embodiments, and both for use on the ground on earth as well as in applications in space flight conditions. Several US patent application publications such as US 2001/0,042,441, US 2007/0,239,098, and US 2008/0,171,962, as well as US patents such as U.S. Pat. Nos. 4,102,655 and 6,478,962 disclose example arrangements that serve to filter gas bubbles out of a circulating flow of human blood. In such an application, the separated gas bubbles do not need to be accumulated and stored over a longer period of time. Therefore, the bubble trap concepts disclosed in such patent documents relating to the separation of gas bubbles from blood are fundamentally different from, and not applicable to, the requirements of bubble trap applications in space flight technology. More particularly, the bubble traps or gas separator devices known from these prior patent publications are not designed and are not useable for separating gas from liquid fuel in a spacecraft for space flight.

Furthermore, U.S. Pat. Nos. 5,334,239 and 6,432,178 disclose gas separator devices that are also suitable for use in space flight technology. For example, U.S. Pat. No. 5,334,239 discloses a gas separator or bubble trap that achieves a separation of a gaseous phase from a liquid phase by causing a rotation of the liquid. Namely, the inertia of the liquid is used in a cyclonic separation technique in order to separate the gas from the liquid. It is a disadvantage of such a technique and such a gas separator device, that a separation of the gas from the liquid by means of the inertia of the liquid requires a comparatively large volume flow of liquid. However, especially for the position regulation of a spacecraft, sometimes only very small volume flows of the liquid fuel are needed for operation of the spacecraft engine over very short operating times. Such a low volume flow during such short times is not adequate to achieve a reliable gas separation based on the inertia of the liquid in a cyclonic separation technique. Therefore, the gas separator device known from U.S. Pat. No. 5,334,239 is not suitable in such cases in which only a small volume flow of liquid fuel must be supplied to an engine during short operating times.

The gas separator device disclosed in U.S. Pat. No. 6,432,178 includes a screen arranged orthogonally to the flow direction of the gas-liquid mixture. The gas bubbles are supposed to collect on this screen. However, it is disadvantageous in this known arrangement, that the portion of the screen surface that is already covered with one or more gas bubbles becomes blocked by the gas bubble(s) and thus reduces the remaining surface area that is available for the liquid to flow through the screen. This results in local pressure losses or pressure drops across the screen. This can be problematic especially in that the screen surface area that is covered with the gas bubble(s) must be taken into account when determining the pressure drop or loss through the gas separator device, during the design of the device. As a result, very large screen surface areas can be required for the device. Furthermore, if the gas quantity becomes too large over time, under some circumstances the liquid flow velocity through the remaining unblocked area of the screen can become so great that gas can also be pushed through the screen.

SUMMARY OF THE INVENTION

In view of the above, it is an object of the invention to further develop and improve a bubble trap or gas separator device of the general type discussed above, for separating gas bubbles from a liquid, especially a liquid fuel supplied from a fuel tank, in such a manner so that even small volume flows and small quantities of fuel can be supplied free of gas bubbles through the bubble trap. The invention further aims to provide a simple and economical construction of a bubble trap, that is also robust, reliable, and highly effective at separating and removing large and small gas bubbles from a flowing liquid such as fuel for a spacecraft engine. A further aim of the invention is to provide such a bubble trap that can accumulate and store a volume of removed gas bubbles which is expected to arise throughout the course of a given space flight mission. The invention still further aims to avoid or overcome the disadvantages of the prior art, and to achieve additional advantages, as apparent from the present specification. The attainment of these objects is, however, not a required limitation of the claimed invention.

The above objects have been achieved according to the invention in a bubble trap or gas separator device, preferably a bubble trap for a fuel tank or fuel line system of a spacecraft, wherein the bubble trap comprises a rotationally symmetrical accumulating or collecting container, a plurality of liquid guide vanes or guide plates arranged in the area of the outer wall of the collecting container so that each one of the guide plates extends essentially radially and meridionally, an inlet and an outlet respectively communicating into the interior space of the collecting container, a sieve cone or gas separator that is arranged near the outlet area of the collecting container and that is provided with through-holes and has a conical shape which tapers in a direction toward the outlet, as well as at least one screen arranged between the conical gas separator and the outlet.

In the inventive bubble trap, small gas bubbles are separated from the liquid fuel by the conical gas separator, and large gas bubbles are separated and directed into the central interior space of the collecting container by the fuel guide plates, namely the fuel is held and guided along the guide plates by the surface tension or arising capillary effect. The accumulating gas is thereby maintained in the central interior space or reservoir space of the collecting container. Particularly, in the inventive bubble trap, the accumulating gas bubbles are reliably held as an accumulated gas volume in the central interior reservoir space by means of the capillary surface tension of the liquid fuel on the bubble trap components. In fact, the surface tension effect is sufficient to reliably hold the accumulating gas in the reservoir space even in the event of arising interfering accelerations. The liquid fuel tanks or fuel line systems of spacecraft that are outfitted with such a bubble trap according to the invention are therefore especially suitable for use in low acceleration conditions, or especially also low gravity conditions or even micro-gravity conditions. Thus, the bubble trap according to the invention is especially suitable for application in spacecraft. The inventive bubble trap can be installed in a fuel tank, e.g. near and upstream of the fuel outlet of the fuel tank, or in a fuel line downstream from the fuel tank outlet. Moreover, while the inventive bubble trap is especially suitable for such installation and use in spacecraft fuel systems, it is not limited to such applications, but rather can be used in other applications in which gas bubbles must be removed from a flowing liquid and then accumulated and stored in the bubble trap.

The inventive bubble trap is embodied as a gas separator and collecting container, which ensures the separation of the liquid fuel from the gaseous driving gas, if the driving gas has penetrated into the fuel line system or the bubble trap. The bubble trap then separates the gas from the liquid fuel and restrains and retains the gas in a stable manner by means of the surface tension effect and especially capillary rise and surface tension aids. Thereby the invention achieves a sure separation of the gas from the liquid for both small volume flows as well as large volume flows. The accumulating gas bubble stored in the bubble trap can furthermore be stored therein for a period of time as long as desired, whereby the size of the bubble trap simply must be designed to provide the respective desired or required gas storage volume for the necessary duration. Also, the bubble trap is able to tolerate and operate reliably despite typical interfering influences, e.g. accelerations, that arise in spacecraft during various maneuvers. Furthermore, the special embodiment and configuration of the bubble trap according to the invention ensures that no gas bubbles will accumulate directly on the final-stage screens, but instead will already by separated and accumulated by the guide plate and the conical gas separator upstream from the screens. In this manner, the inventive bubble trap can retain and hold gas bubbles over a relatively long period of time in a stable manner, without negatively influencing the flow conditions and especially the pressure drop through the bubble trap device, so that the liquid fuel can continue to flow through the device without an increased pressure drop even as the separated gas accumulates in the interior space.

The production costs for the inventive bubble trap are comparatively low, due to the relatively low required volume for achieving optimal functionality. The use of such a bubble trap in the fuel line system downstream from the fuel tank in a spacecraft allows the requirements with respect to a bubble-free fuel withdrawal out of the fuel tank to be considerably reduced, because even if gas bubbles escape from the tank in the fuel, a defined quantity of such gas in the supplied liquid fuel can be tolerated because it will be separated and stored in the bubble trap. Namely, the inventive bubble trap acts as an additional safety measure to trap and accumulate up to a defined quantity of gas bubbles that escape from the fuel tank in the supplied liquid fuel. As a result, also the production costs for such a fuel tank can be further reduced, due to the reduced need for gas separation measures directly in the tank. Still further because the fuel tanks can thereby be substantially simplified in their construction, this also achieves a considerable mass or weight savings, which offsets and exceeds the relatively small additional weight of the inventive bubble trap.

Another advantage of the invention is that the inventive bubble trap is designed so that it can be constructed using relatively simple standard elements, which can generally be used for surface tension liquid separator tanks. This achieves a further reduction of the production costs. This also simplifies the space flight qualification procedures for achieving approval of the inventive bubble trap in space flight systems. For example, standard screen adapters, which are already used in conventional surface tension tanks, and which are already qualified for use in spacecraft for space flight, can also be used for the inventive bubble trap.

BRIEF DESCRIPTION OF THE DRAWINGS

In order that the invention may be clearly understood, it will now be described with reference to an example embodiment thereof as shown in the drawings, wherein.

DETAILED DESCRIPTION OF A PREFERRED EXAMPLE EMBODIMENT AND BEST MODE OF THE INVENTION

Figure 1:
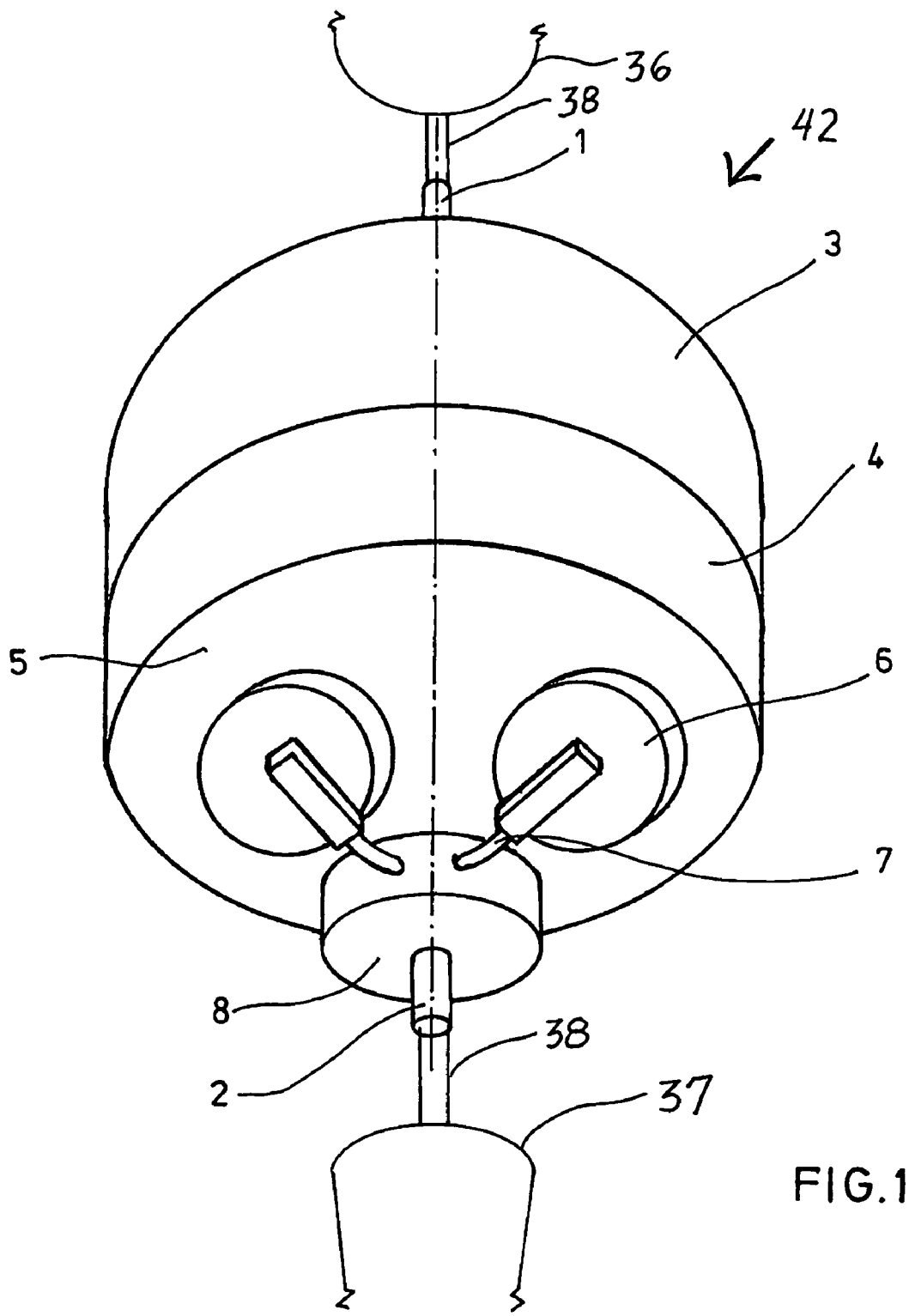
FIG. 1 is a schematic perspective view of a bubble trap or gas separator device according to the invention.

The apparatus 42 illustrated in FIG. 1 is a bubble trap or gas separator device that is especially suitable and adapted for connection in a fuel line 38 downstream from a fuel tank 36 that receives and stores a liquid fuel, which is generally aggressive and may be a combustion fuel or an oxidizer, for the operation of a rocket engine 37 of a spacecraft. The fuel tank 36, the rocket engine 37, and the fuel line 38 are merely schematically indicated, and may have any conventionally known form, configuration and arrangement. Also, the fuel tank 36 and the rocket engine 37 are only partially indicated, because the size of the inventive bubble trap is generally significantly smaller than that of the fuel tank and the rocket engine. The liquid fuel may for example be MMH, $N_2O_4$ or hydrazine. In addition to the liquid fuel, the tank 36 further contains a pressurized driving gas such as helium or nitrogen. The inventive bubble trap is connected in the fuel line 38 downstream from the fuel tank 36 to trap, separate and accumulate any gas bubbles that might escape from the fuel tank 36 in the liquid fuel supplied through the fuel line 38, so that bubble-free fuel is then supplied from the bubble trap to the engine 37.

The bubble trap comprises an outer shell container that includes a half-spherical shell 3 joined to one end of a cylindrical shell 4, of which the other end is joined to a conical shell 5. The conical shell 5 especially has a downwardly tapering conical frustum shape with flat bottom. A substantially cylindrical liquid collector 8 is connected on the outside of the nominally bottom end of the conical shell 5, and a plurality of substantially cylindrical screen adapters 6 are distributed around and arranged on the outside on the conical wall of the conical shell 5. Connector pipes or tubes 7 respectively connect the screen adapters 6 to the liquid collector 8. A fuel inlet is provided at the nominally top end of the half-spherical shell 3, and an inlet pipe 1 is connected thereto. A fuel outlet is provided at the nominally bottom end of the liquid collector 8, and an outlet pipe 2 is connected thereto. The collecting container formed by the shell components 3, 4 and 5 encloses therein a hollow space including an interior reservoir space 35. Liquid flow communication is established from the inlet pipe 1 into the hollow space, then out through the screen adapters 6 and the liquid collector 8, and from there out through the outlet pipe 2.

Figure 2:
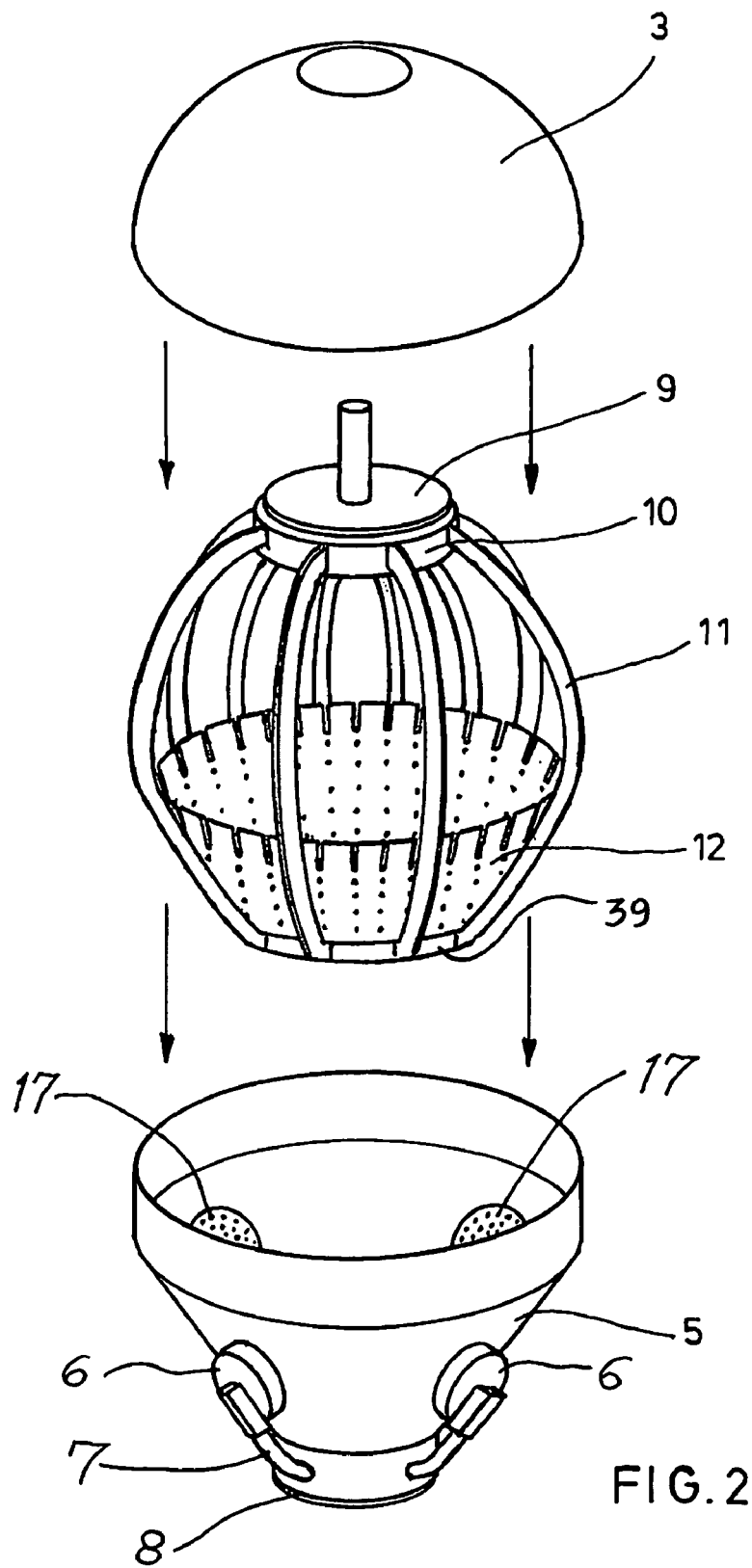
FIG. 2 is an exploded perspective view of the arrangement according to FIG. 1.

The exploded view shown in FIG. 2 clarifies the internal structure of the inventive bubble trap. An upper tank cap 9, an impingement baffle plate 10, a plurality of liquid guide vanes or plates 11, as well as a bottom sieve cone or conical gas separator 12 are arranged within the hollow space of the collecting container formed by the outer shell wall components described above. The liquid guide vanes 11 form a cage-like structure joined together near the top by the upper tank cap 9 and impingement baffle plate 10, and joined together near the bottom by a ring 39. The liquid guide vanes 11 are configured as webs or ribs that extend substantially along lines of longitude or meridians on the outer wall of the shell components 3, 4 and 5, whereby the web plane of each guide plate 11 extends radially, i.e. locally orthogonal to the surface of the respective shell component 3, 4 or 5. The radially inwardly facing edges of the guide vanes 11 are bounded by a circular cut-out or edge termination 19 that bounds a substantially spherical open interior reservoir space 35 within the cage-like structure formed by the guide vanes 11, in the hollow space within the container, as can be seen especially in FIG. 4.

Figure 3:
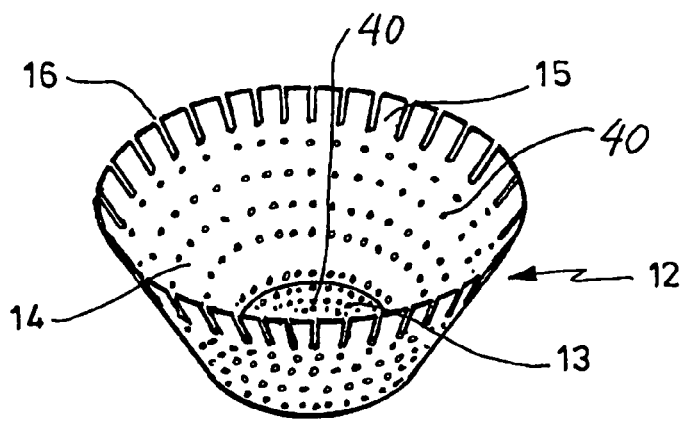
FIG. 3 is a perspective view of a conical gas separator or sieve cone as used in the lower portion of the arrangement according to FIGS. 1 and 2.

The lower sieve cone or conical gas separator 12 is shown as a detail on an enlarged scale in FIG. 3. Similar to the configuration of a household sieve or colander, the conical gas separator 12 comprises a flat bottom or floor 13 as well as a conical wall 14. Except for the upper rim portion 15 of the conical wall 14, the conical gas separator 12 is provided with through-holes 40 that pass through the wall of the gas separator 12. The holes 40 are at least approximately uniformly distributed over the surface of the gas separator 12, except for the upper rim portion 15 of the conical wall 14. Furthermore, the upper rim portion 15 is provided with slits or slots 16 that are distributed uniformly about the circumference. These slits or slots 16 are configured as cut slots that penetrate downwardly beginning from the upper free edge of the upper rim portion 15. The through-holes 40 and the slots or slits 16 are dimensioned appropriately to trap small gas bubbles, as will be discussed further below.

Figure 4:
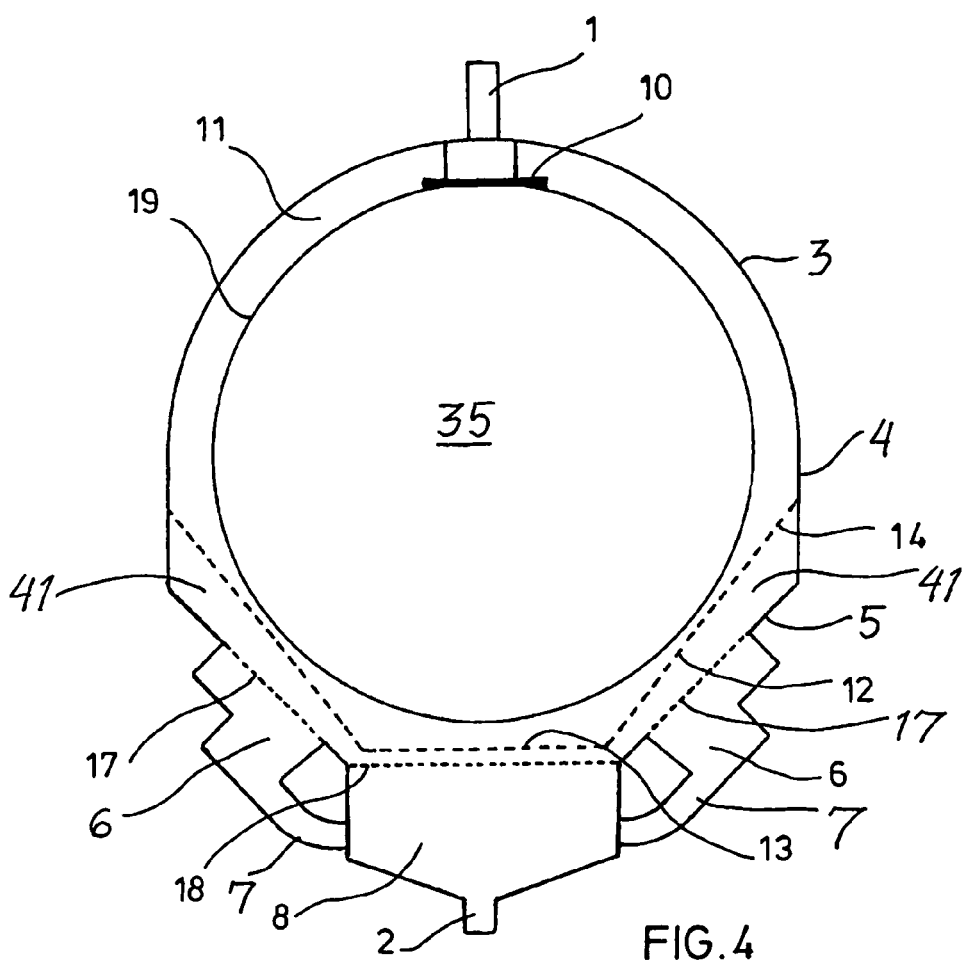
FIG. 4 is a schematic axial sectional view through the bubble trap according to FIG. 1.

FIG. 4 schematically represents an axial section through a bubble trap according to the present example embodiment of the invention. It can be seen how the half-spherical shell 3, the cylindrical shell 4, and the conical shell 5 together form the overall shape and outer wall construction of the collecting container of the bubble trap. It can also be seen how the liquid guide vanes or plates 11 are arranged along the inner surface of the shell components 3, 4 and 5, whereby the radially inner edge of the guide vanes 11 are bounded by a circular cut-out 19 forming the interior reservoir space 35 in the present example embodiment. It should be understood, however, that other shapes are also possible. Still further it can be seen how the conical gas separator 12 is fitted and arranged into the collecting container and especially the cylindrical shell 4 and the conical shell 5 thereof. The conical wall 14 of the gas separator 12 preferably has a steeper slope than the wall of the conical shell 5, so as to form an upwardly widening, i.e. downwardly tapering, annular conical gap 41 between the conical wall 14 of the gas separator 12 and the conical shell 5. This gap directs and channels the liquid flow downwardly and out through screens 17 (as will be discussed below) and helps to trap gas bubbles and prevent any bubbles from getting out past the screens 17. The flat bottom or floor 13 of the gas separator 12 extends parallel to and spaced above a bottom screen 18 (as further discussed below), and forms a further liquid flow passage.

As further shown in FIG. 4 and also evident in FIG. 2, the bubble trap additionally comprises plural side screens 17 arranged on the conical wall of the conical shell 5, and particularly arranged on and covering respective through-holes provided through the conical shell 5 at plural locations distributed about the circumference. The interior reservoir space 35 enclosed within the collecting container communicates through the side screens 17 respectively into the screen adapters 6 arranged on the outside of the conical shell 5 as can be seen in FIGS. 1, 2 and 4. The screen adapters 6 can respectively hold and mount the side screens 17 in or on the through-holes that are provided through the conical wall of the conical shell 5. The bubble trap further comprises a bottom screen 18 arranged to cover a bottom opening of the conical frustum shell 5, whereby the interior reservoir space 35 communicates through the bottom screen 18 into the liquid collector 8. Connector pipes or tubes 7 connect the individual screen adapters 6 to the liquid collector 8, for liquid flow communication from the screen adapter 6 to the liquid collector 8.

With the above construction, the combination of the liquid guide vanes 11 bounding the interior reservoir space 35, together with the lower sieve cone or gas separator 12, forms the actual functional bubble trap, which separates and traps gas bubbles from the liquid fuel supplied into the bubble trap through the inlet pipe 1, so that those gas bubbles do not reach and accumulate on the screens 17 and 18, which form a final barrier against the passage of gas bubbles, so that bubble-free liquid fuel will accumulate in and be discharged from the screen adapters 6 and the liquid collector 8 to then flow out through the outlet pipe 2. Furthermore, the bubble trap is so designed and constructed that it can be filled completely with liquid, without trapping any gas therein. Then when gas bubbles enter into the bubble trap during operation, the gas bubbles are trapped and accumulated in the reservoir space 35 while displacing out the liquid. This process will be further explained in detail in the following.

Figure 5:
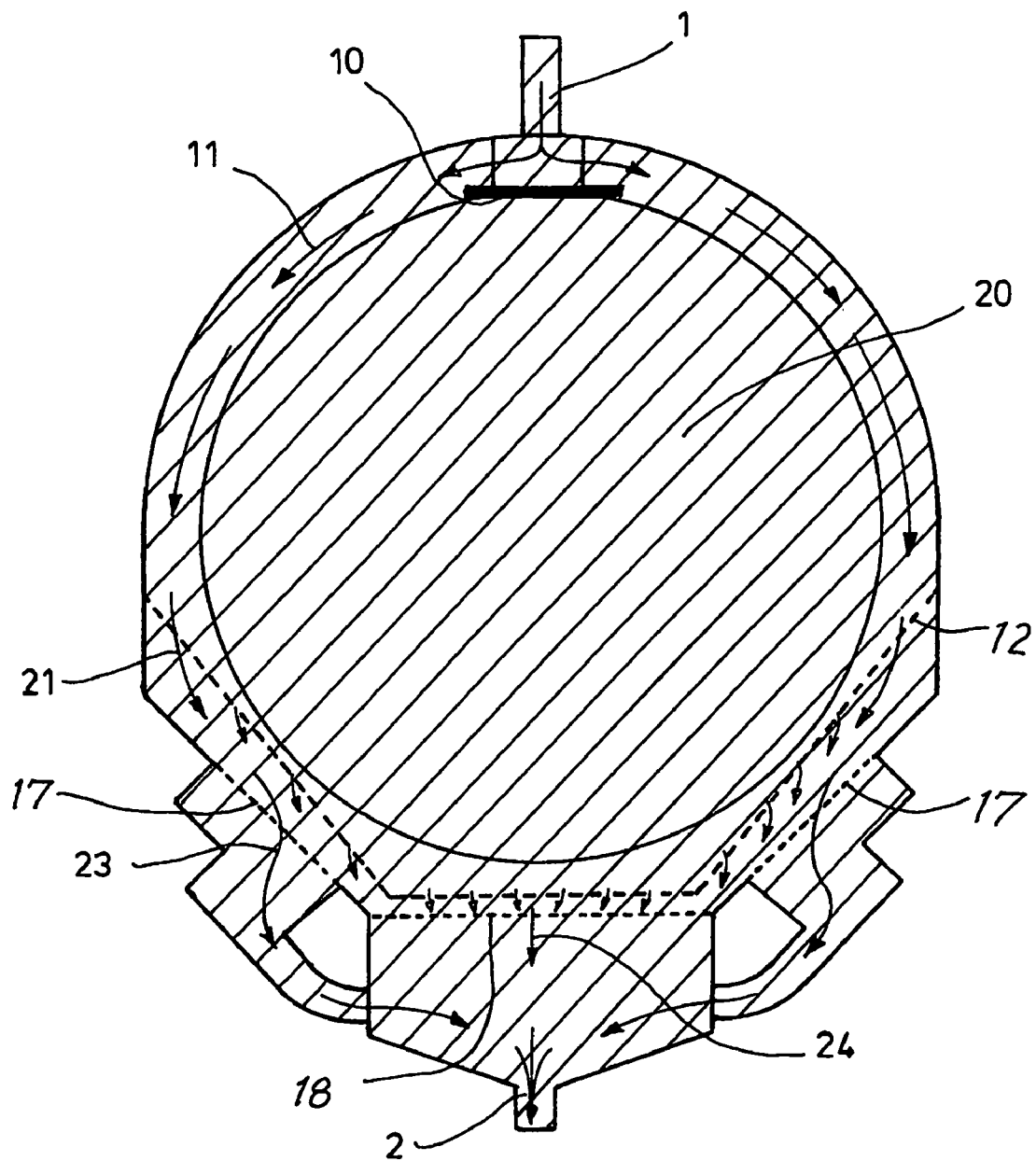
FIG. 5 is a view similar to FIG. 4, but representing the flow direction pattern when the bubble trap is completely full of liquid.

FIG. 5 illustrates the bubble trap in a state in which it has been completely filled with a liquid fuel supplied into it through the inlet pipe 1. In this FIG. 5, the slanted hatching lines are intended to schematically indicate the liquid fuel 20 completely filling all of the hollow space within the bubble trap. If no gas bubbles are entrained in the supplied liquid fuel, and thus no gas is introduced into the bubble trap, then the liquid fuel 20 will be distributed from the inlet pipe 1 when the in-flowing fuel is correspondingly deflected by the impingement baffle plate 10. As a result, the liquid fuel then predominantly flows along the outer wall of the half-spherical shell 3, while being guided along the liquid guide vanes 11. The liquid fuel then further predominantly flows along the outer wall of the cylindrical shell 4 and then passes through the through-holes 40 and slots 16 of the conical wall 14 of the gas separator 12 as represented by the flow arrow 21, and from there passes through the annular conical gap 41 to and outwardly through the side screens 17 into the screen adapters 6, and then through the connector tubes 7 to the liquid collector 8, as shown by the liquid flow arrows 23. Liquid fuel also flows through the through-holes 40 of the perforated flat bottom floor 13 of the gas separator 12 and from there to and outwardly through the bottom screen 18 into the liquid collector 8, as shown by the liquid flow arrow 24. The liquid fuel then flows from the liquid collector 8 out through the outlet pipe 2.

The components of the bubble trap are configured, dimensioned and arranged so that the arising pressure drop for the liquid flowing through the bubble trap is quite small, especially due to the large surface area of the conical gas separator 12 and the screens 17 and 18. The gas separator 12 provides a large surface area, i.e. a large through-flow area, especially due to its large circumference and the large extent to which it extends upwardly along the conical shell 5 and the cylindrical shell 4, and also combines the conical wall 14 with the flat bottom floor 13.

Figure 6:
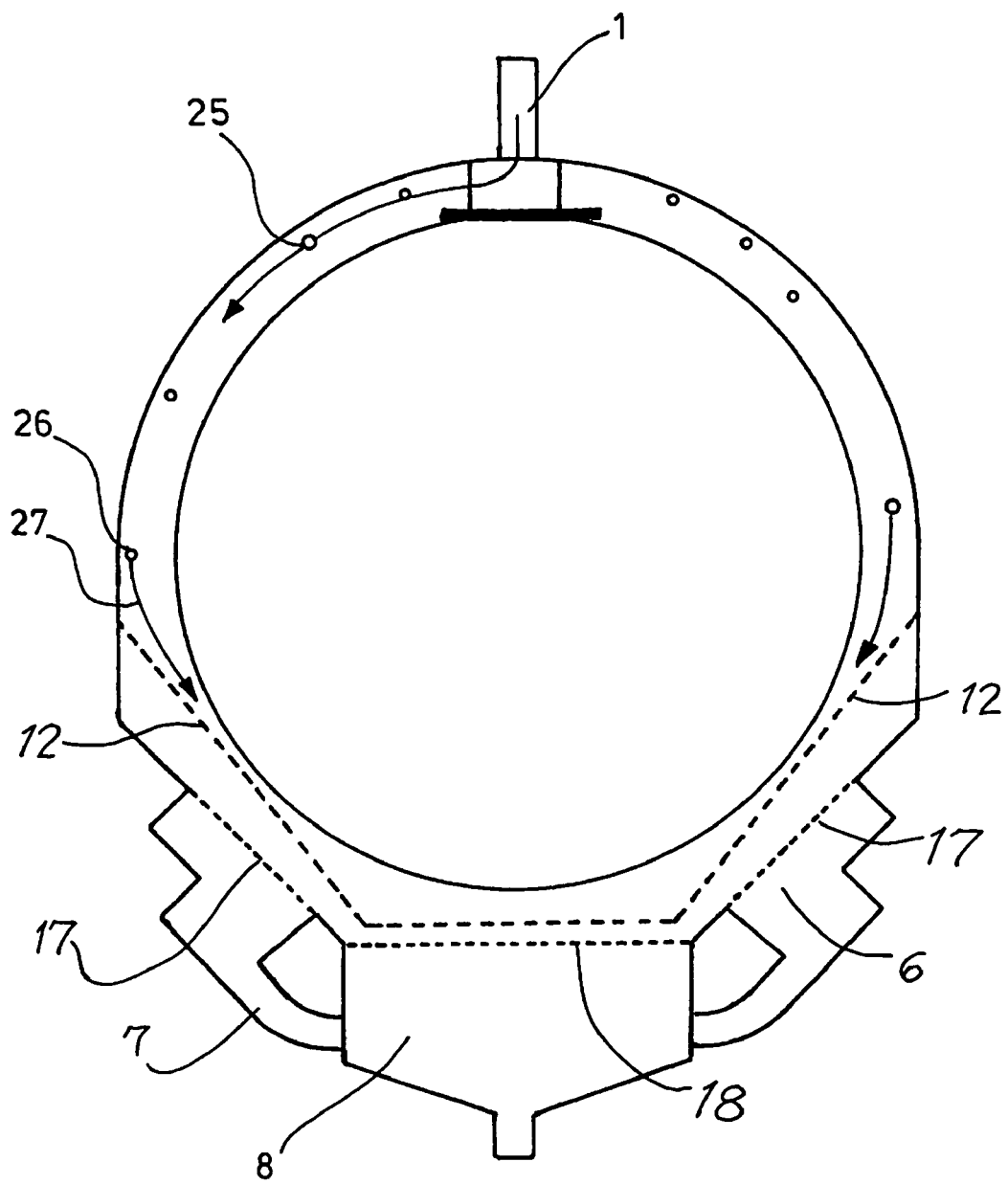
FIG. 6 is a view similar to FIG. 5, but showing the flow direction pattern when small bubbles entrained in the liquid stream penetrate into the bubble trap.

FIG. 6 schematically represents the case in which small gas bubbles 25 and very small gas bubbles 26 are entrained in the liquid fuel flowing into the bubble trap through the inlet pipe 1. The liquid fuel is not shown in FIG. 6 for the sake of clarity, but rather merely the gas bubbles 25 and 26 are shown. While larger gas bubbles can be separated by the liquid guide vanes 11 due to the surface tension, some small bubbles 25 and very small bubbles 26 cannot be separated by the liquid guide vanes 11, because they do not form a meniscus with the liquid fuel on these liquid guide vanes 11. Therefore the small bubbles 25 and especially the very small bubbles 26 flow with the liquid fuel downwardly along the guide vanes 11 and then onto and along the conical wall 14 of the gas separator 12 as shown by the arrow 27. The through-holes 40 and the slots 16 of the gas separator have sizes properly adapted for separating and trapping essentially all of the very small gas bubbles 26, namely so that the surface tension prevents the small and very small bubbles from passing through the holes and slots. Particularly, in the present example embodiment, the through-holes 40 have a maximum diameter and the slots 16 have a maximum width of about 1 mm (e.g. preferably 1 mm, or more generally in the range of 1 mm+/−10%), so as to separate and deflect the bubbles downwardly along the conical walls 14 as shown by the flow arrow 27. If, however, extremely small bubbles still manage to penetrate through and past the conical gas separator 12, then such extremely small bubbles will flow with the liquid fuel to the screens 17 and 18, which will then separate, trap and retain such extremely small bubbles below the gas separator 12. Therefore, the screens may have smaller opening cross-sections than the holes 40 and slots 16. Bubbles can then also coalesce and be trapped in the space or gap between the gas separator 12 and the screens 17 and 18.

Figure 7:
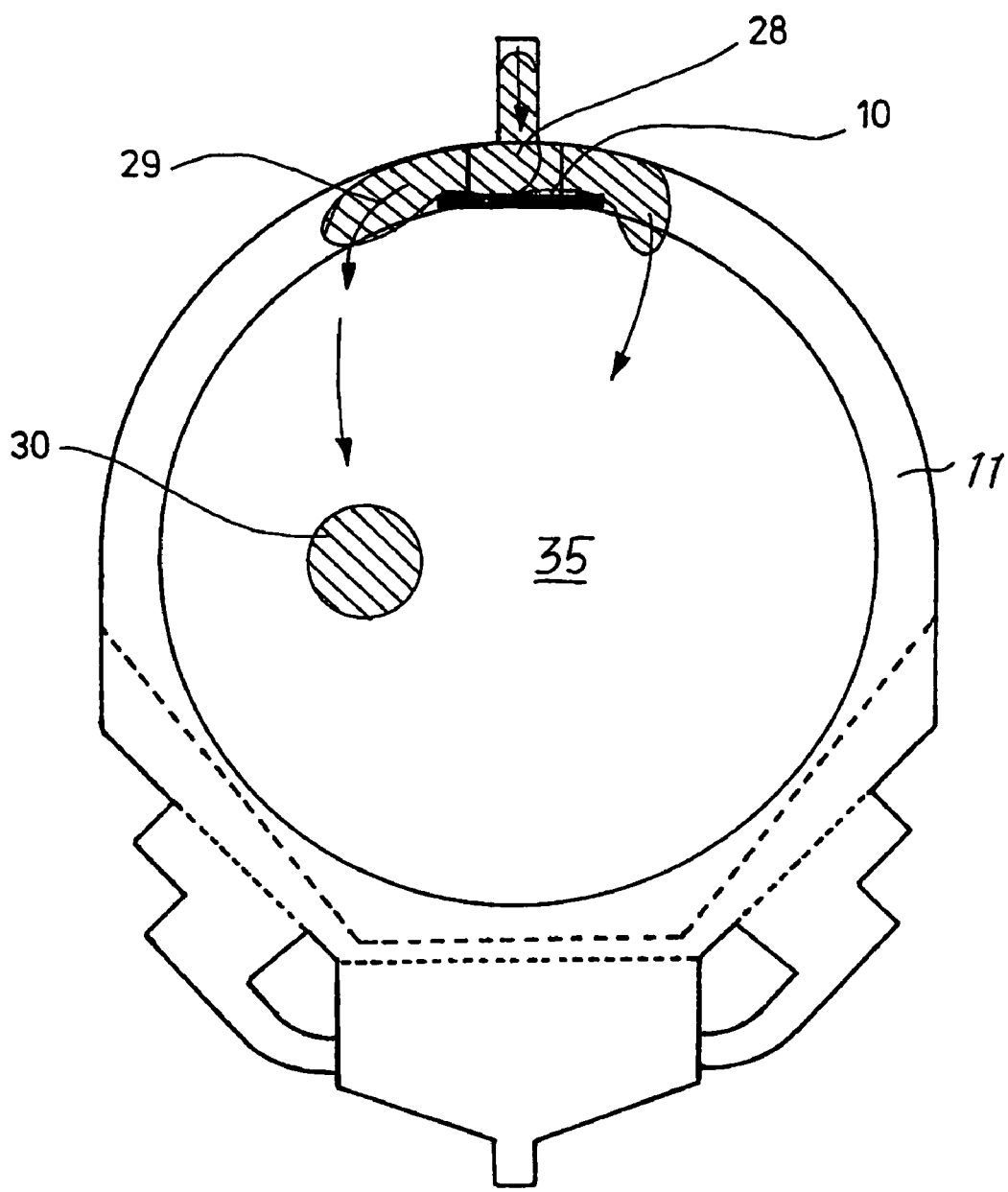
FIG. 7 is a view similar to FIG. 6, but showing the situation when large quantities of gas penetrate into the bubble trap.

FIG. 7 schematically illustrates the situation in which a larger quantity, e.g. a "blob" or pocket, of gas 28 enters through the inlet pipe 1 into the bubble trap. Here in FIG. 7, the diagonal sloping hatch lines represent the gas, while the liquid in the bubble trap is not shown for the sake of clarity. But it is to be understood that the liquid fills the rest of the interior space of the bubble trap except for the areas indicated as gas by the diagonal sloping hatch lines. In this situation, the large quantity of gas 28 is also deflected by the impingement baffle plate 10 laterally in directions toward the sidewalls of the half-spherical shell 3 along the liquid guide vanes 11. Thereby, the capillary pressure established by these guide vanes 11 holds the liquid and causes the gas to be deflected in a direction toward the center of the bubble trap, i.e. radially inwardly away from the outer walls of the half-spherical shell 3 and the cylindrical shell 4, as shown by the direction arrow 29. In this manner, a series of bubbles will be collected in the central interior reservoir space 35 of the bubble trap, where these individual gas bubbles over time will coalesce to form a single, growing, large bubble 30, especially under the influence of weightlessness in orbit or in space.

Figure 8:
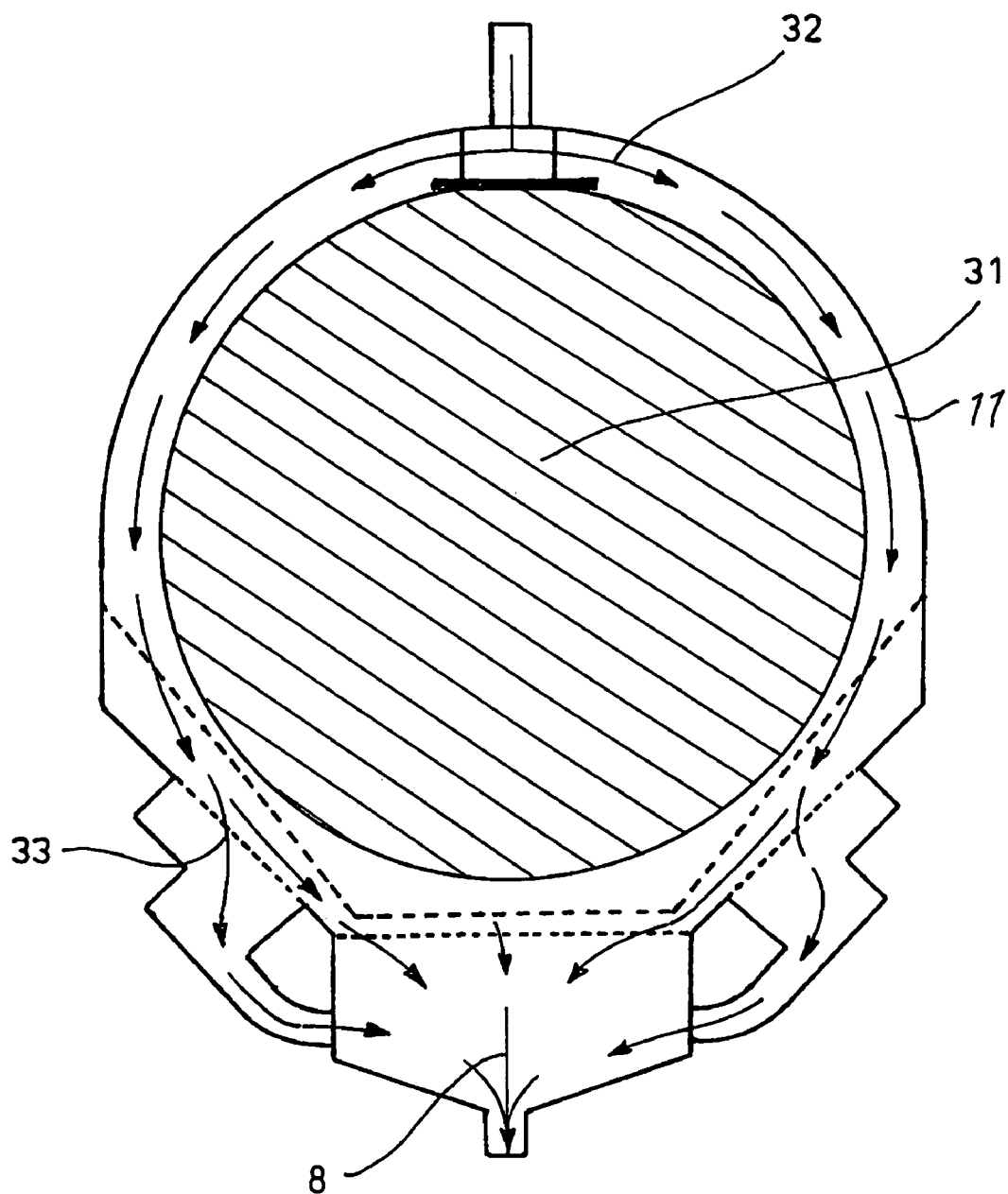
FIG. 8 is a view similar to FIG. 7, but showing the flow direction pattern when the bubble trap has reached its maximum gas accumulation capacity.

Over a longer time span, in this manner always more gas will be accumulated in the interior reservoir space 35 of the bubble trap, until the accumulated gas forms a large gas bubble having the maximum possible size 31 as shown schematically by the diagonal sloping hatch lines in FIG. 8. In this state, wherein the bubble trap contains the maximum possible amount of trapped gas, the liquid guide vanes 11 hold the gas bubble stably in the central interior reservoir space 35 of the bubble trap, while liquid fuel can still flow along the liquid guide vanes in the portion of the hollow space radially outside of the central interior reservoir space. Particularly, the number and the dimensions of the liquid guide vanes are to be selected depending on the expected arising accelerations, so that the capillary force developed by the guide vanes will reliably hold the liquid on the container walls and the guide vanes, and thereby also hold the gas bubble in the central interior reservoir space 35.

Once sufficient gas has accumulated so that the interior reservoir space 35 is completely full of gas 31 as illustrated in FIG. 8, then the bubble trap has reached its maximum gas uptake capacity. Nonetheless, if further liquid fuel is supplied into the bubble trap, the liquid fuel will flow along the outer wall formed by the half-spherical shell 3, the cylindrical shell 4, and the conical shell 5, in the longitudinal spaces between adjacent guide vanes 11, as shown by the arrow 32, and will then flow out through the gas separator 12 and the screens 17 and 18 as shown by the arrow 33. Thus, liquid fuel can still flow through, even when the bubble trap is completely full of gas. Some gas bubbles can then still be trapped on the gas separator 12 and the screens 17 and 18. However, in order to ensure the further bubble-trapping operation, while allowing unhindered liquid fuel flow, the accumulated gas will have to be emptied out of the bubble trap once it reaches the full state shown in FIG. 8. The bubble trap is preferably dimensioned appropriately based on the expected mission duration, fuel demand, and typical gas bubble content of the liquid fuel, so that the gas storage capacity of the bubble trap is sufficient for the bubble trap to operate during the entire mission, without needing to have the accumulated gas emptied from the bubble trap.

In this manner, the inventive bubble trap arranged downstream from a liquid supply such as a fuel tank, makes it possible to reliably separate up to a defined gas quantity out of the liquid such as the liquid fuel. Thereby irregularities or variations as they typically arise in spacecraft fuel systems can be tolerated.

Furthermore, the bubble trap is preferably so dimensioned, that the residual quantity of liquid (e.g. liquid fuel) remaining in the bubble trap becomes very small relative to the total volume of the bubble trap, due to the accumulated gas therein, over the course of a space flight mission. Optimally, the space or area between the guide vanes 11 is also completely filled with gas by the end of the useful operation of the bubble trap, whereby it is ensured that the residual quantity of liquid remaining in the bubble trap is reduced to a minimum. In this manner, unusable or trapped residual fuel, and thereby wasted fuel and wasted weight, is minimized.

The components of the bubble trap can be fabricated of metal, e.g. a lightweight and corrosion-resistant metal alloy, or of composite material, for example.

Directions recited herein are to be understood as only being references relative to one another, or relative to a nominal orientation based on the primary acceleration direction or a primary gravitational direction, as discussed above.

The term "proximate" to the outlet (or the inlet), means closer to the outlet than the inlet (or vice versa).

The term "conical" does not require a complete cone coming to a vertex point, but rather also encompasses a conical frustum shape.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure is not intended to define or limit the claimed invention, but rather merely abstracts certain disclosed features or embodiments within the scope of the claimed invention.

What is claimed is:

1. A bubble trap for separating gas bubbles from a liquid, comprising:
   a rotationally symmetrical container comprising a container wall that bounds a hollow space therein;
   an inlet communicating into said hollow space through said container;
   an outlet communicating out of said hollow space through said container;
   a plurality of guide vanes arranged extending radially inwardly inside said container wall;
   a gas separator comprising a perforated conical wall that is arranged proximate to said outlet, and that conically tapers in a direction toward said outlet, and that is perforated with through-holes; and
   at least one first screen arranged between said gas separator and said outlet.

2. The bubble trap according to claim 1, wherein said conical wall of said gas separator is shaped as a conical frustum, and wherein said gas separator further comprises a flat bottom floor at a narrower open end of said conical wall.

3. The bubble trap according to claim 2, wherein said flat bottom floor is perforated with more of said through-holes.

4. The bubble trap according to claim 2, wherein said at least one screen includes at least one first screen arranged adjacent to said conical wall and at least one second screen arranged adjacent to said flat bottom floor.

5. The bubble trap according to claim 4, wherein said screens are respectively arranged in or on respective openings through said container wall so that said screens cover said openings and form communication paths from said hollow space through said screens to said outlet.

6. The bubble trap according to claim 5, wherein said container wall includes a conical frustum shell and a flat bottom at a narrower tapered end of said conical frustum shell, wherein said openings include plural first openings distributed circumferentially about said conical frustum shell and a second opening in said flat bottom, and wherein said at least one first screen includes plural first screens respectively arranged in or on said first openings and one second screen arranged in or on said second opening.

7. The bubble trap according to claim 6, wherein said container further comprises a liquid collector arranged outside on said flat bottom to cover said second opening, and plural screen adapter covers arranged outside on said conical frustum shell respectively to cover said first openings, wherein said outlet communicates out through said liquid collector.

8. The bubble trap according to claim 7, further comprising connector pipes respectively connecting said screen adapter covers to said liquid collector outside of said container wall.

9. The bubble trap according to claim 1, further comprising an outlet pipe connected to and extending outwardly from said outlet, wherein said container further comprises a liquid collector arranged on said container wall, and wherein said outlet is provided on said liquid collector.

10. The bubble trap according to claim 1, wherein said gas separator is arranged and configured so as to form a tapering annular gap between said perforated conical wall of said gas separator and said container wall, and wherein a width of said gap increases in a direction in which a diameter of said perforated conical wall increases.

11. The bubble trap according to claim 1, wherein an upper rim portion of said conical wall of said gas separator has plural elongated slots therein distributed uniformly about a circumference thereof.

12. The bubble trap according to claim 11, wherein said upper rim portion of said conical wall of said gas separator with said elongated slots is not perforated with said through-holes, and said through-holes are uniformly distributed over a remainder of said conical wall other than said upper rim portion.

13. The bubble trap according to claim 11, wherein said slots have a width of about 1 mm, and said through-holes have a diameter of about 1 mm.

14. The bubble trap according to claim 1, further comprising an impingement baffle plate arranged in said container proximate to and transversely intersecting an axis of said inlet.

15. The bubble trap according to claim 1, wherein said container comprises a semi-spherical shell, a cylindrical shell and a conical frustum shell that are joined to one another to form said container wall, and wherein said inlet communicates through said semi-spherical shell, and wherein said conical frustum shell is opposite said semi-spherical shell with said cylindrical shell therebetween.

16. The bubble trap according to claim 1, wherein said guide vanes extend along longitudinal meridians on an inner surface of said container wall, and are joined together to form a cage structure by respective rings at upper and lower ends of said guide vanes, and wherein radially inner edges of said guide vanes bound an interior reservoir space within said hollow space inside said container.

17. The bubble trap according to claim 1, wherein said gas separator spans an entire sectional area of said hollow space in said container, so that all of the liquid flowing through said hollow space from said inlet to said outlet must flow through said gas separator before reaching said at least one screen.

18. A bubble trap for separating gas bubbles from a liquid, comprising:
   a rotationally symmetrical container comprising a container wall that bounds a hollow space therein;
   an inlet communicating into said hollow space through said container;
   an outlet communicating out of said hollow space through said container;
   a plurality of guide vanes arranged extending radially inwardly inside said container wall;
   a gas separator that is arranged proximate to said outlet, and that comprises a perforated conical frustum wall which conically tapers in a direction toward said outlet and a perforated flat bottom floor at a narrower open end of said conical frustum wall, wherein said conical frustum wall and said flat bottom floor are perforated with through-holes; and
   plural screens arranged between said gas separator and said outlet, including at least one first screen arranged adjacent to said conical frustum wall and at least one second screen arranged adjacent to said flat bottom floor, wherein said screens are respectively arranged in or on respective openings through said container wall so that said screens cover said openings and form communication paths from said hollow space through said screens to said outlet.

19. A combination of a bubble trap, a spacecraft fuel tank, a spacecraft rocket engine, a first fuel line connecting said fuel tank to said bubble trap, and a second fuel line connecting said bubble trap to said rocket engine, wherein said bubble trap is adapted to remove gas bubbles from fuel supplied from said fuel tank through said first fuel line, and wherein said bubble trap comprises:
   a rotationally symmetrical container comprising a container wall that bounds a hollow space therein;
   an inlet connected to said first fuel line and communicating into said hollow space through said container;
   an outlet communicating out of said hollow space through said container and connected to said second fuel line;
   a plurality of guide vanes arranged extending radially inwardly inside said container wall;
   a gas separator comprising a perforated conical wall that is arranged in an area proximate to said outlet, and that conically tapers in a direction toward said outlet, and that is perforated with through-holes; and
   at least one screen arranged between said gas separator and said outlet.

* * * * *